United States Patent
Torikoshi et al.

(10) Patent No.: US 6,229,961 B1
(45) Date of Patent: May 8, 2001

(54) NEARBY PHOTOGRAPHY ADAPTER ATTACHABLE AND DETACHABLE TO AND FROM CAMERA

(75) Inventors: Yuichi Torikoshi, Kanagawa; Sumio Kawai, Hachioji; Yuichi Sato, Kanagawa, all of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/259,931

(22) Filed: Mar. 1, 1999

(30) Foreign Application Priority Data

Mar. 4, 1998 (JP) ................................. 10-052358

(51) Int. Cl.[7] ............................. G03B 11/00; G03B 17/00
(52) U.S. Cl. ......................... 396/71; 396/422; 396/544
(58) Field of Search .......................... 396/14, 16, 18, 396/71, 155, 419, 422, 428, 429, 544

(56) References Cited

U.S. PATENT DOCUMENTS

| 3,687,030 | * | 8/1972 | Dine et al. | 396/544 |
| 3,836,927 | * | 9/1974 | Dine et al. | 396/544 |
| 4,219,264 | * | 8/1980 | Rodeck | 396/140 |
| 4,222,654 | * | 9/1980 | Bodenhamer | 396/428 |
| 4,268,155 | * | 5/1981 | Lehnert et al. | 396/419 |
| 4,283,135 | * | 8/1981 | Lupis | 396/544 |
| 5,541,686 | * | 7/1996 | Stephenson | 396/164 |
| 5,950,017 | * | 9/1999 | Reff | 396/14 |

FOREIGN PATENT DOCUMENTS

| 55-8931 | 1/1980 | (JP) . |
| 61-137934 | 8/1986 | (JP) . |

* cited by examiner

Primary Examiner—David M. Gray
(74) Attorney, Agent, or Firm—Ostrolenk, Faber, Gerb & Soffen, LLP

(57) ABSTRACT

A nearby photography adapter includes a photographic range and camera-to-subject distance indicating frame, a flashlight correcting auxiliary plate, and a distance knob interfering projection. The photographic range and camera-to-subject distance indicating frame is a member mounted on a base plate and collapsed from being erect and usable. The distance knob interfering projection is formed as an integral part of the base plate. When a distance knob on a photographic lens frame is set to a nearby photographic position and the photographic range and camera-to-subject distance indicating frame and auxiliary plate are standing erect, the photography adapter can be attached to a camera and nearby photography can be carried out. Advantageously, with the nearby photography adapter, the photographic range and the camera-to-subject distance can be indicated reliably. Furthermore, the nearby photography adapter can be put away neatly with the components stowed during normal photography.

27 Claims, 10 Drawing Sheets

NEARBY PHOTOGRAPHY ADAPTER ATTACHABLE AND DETACHABLE TO AND FROM CAMERA

BACKGROUND OF THE INVENTION

1. Field of the Invention

The present invention relates to a nearby photography adapter attachable and detachable to and from a camera for performing nearby photography in which a camera-to-subject distance is shorter than that in normal photography.

2. Description of the Related Art

In the past, Japanese Unexamined Utility Model Publication No. 55-8931 has disclosed a technology relating to a camera mount (photography adapter) used for super close-up photography. Super close-up photography is one form of nearby photography in which a camera-to-subject distance is shorter than that in normal photography. Namely, the Japanese Unexamined Utility Model Publication No. 55-8931 has disclosed a strobe unit including the camera mount for super close-up photography. The strobe unit includes a ring strobe that is attachable to the face of a photographic lens and designed for nearby photography. A photographic range and camera-to-subject distance indication frame, and a flashing circuit for controlling the ring strobe are mounted on the camera mount ahead of a camera. The photographic range and camera-to-subject distance indicating frame indicates a photographic range and a camera-to-subject distance suitable for nearby photography.

Moreover, a technology relating to an auxiliary lens unit has been disclosed in Japanese Unexamined Utility Model Publication No. 61-137934. The auxiliary lens unit includes an auxiliary lens used for nearby photography, a lens for correcting a parallax caused by a viewfinder, and a masking member for correcting flashlight (light produced by a flash or strobe unit).

According to the configuration of the strobe unit disclosed in the Japanese Unexamined Utility Model Publication No. 55-8931, when the strobe unit is attached to a camera, the mount must also be attached to the camera. The mount includes the ring strobe and flashing circuit. The strobe unit thus has a drawback that it is hard to attach. Moreover, the strobe unit itself is large and heavy. Furthermore, the ring strobe itself has a drawback that the ray axis of the strobe is located close to the optical axis of a photographic lens. Therefore, when the strobe unit is used to photograph a human being staying positioned at a normal camera-to-subject distance, a pink-eye effect is produced. Specifically, flashlight is reflected from the retinas, causing the eyes of the human to appear red in a color photograph.

Moreover, the auxiliary lens unit disclosed in the Japanese Unexamined Utility Model Publication No. 61-137934 is designed exclusively for nearby photography in which a photographic range is recognized through a viewfinder optical system. For example, when a tiny plant on the ground is photographed in profile or when the camera-to-subject distance set for nearby photography is 30 cm or less, it is hard to look through the viewfinder during photography. Moreover, the auxiliary lens is included. The auxiliary lens unit is therefore large and heavy, hard to handle, and expensive.

SUMMARY OF THE INVENTION

The present invention attempts to solve the foregoing problems. The present invention provides a nearby photography adapter attachable and detachable to and from a camera capable of performing nearby photography in a camera-to-subject distance that is shorter than that in normal photography. Herein, a photographic range and the camera-to-subject distance can be indicated accurately. Furthermore, the adapter can be readily put away with the components stowed neatly during normal photography.

A nearby photography adapter attachable and detachable to and from a camera in accordance with the present invention comprises a mount member, a photographic range and camera-to-subject distance indicating member, and a photographic state sensing member. The mount member can be attached to the camera. The photographic range and camera-to-subject distance indicating member is united with the mount member, and movable to be collapsed and stowed or to become erect and usable. When standing erect, the photographic range and camera-to-subject distance indicating member indicates a photographic range and an in-focus position for a subject which are predetermined for nearby photography. The photographic state sensing member is united with the mount member, and senses whether the camera is set to a predetermined nearby photographic state. When the camera is set to the nearby photographic state, the photographic state sensing member enables mounting of the camera on the mount member.

When the nearby photography adapter is used to perform nearby photography, first, the camera is set to the nearby photographic state. The camera is then mounted on the mount member. The photographic range and camera-to-subject distance indicating member is now standing erect on the mount member and usable. Thus, nearby photography can be carried out.

Other features of the present invention and advantages thereof will be fully apparent from the description below.

DESCRIPTION OF THE PREFERRED EMBODIMENTS

Embodiments of the present invention will be described below in conjunction with the drawings.

Figure 1:
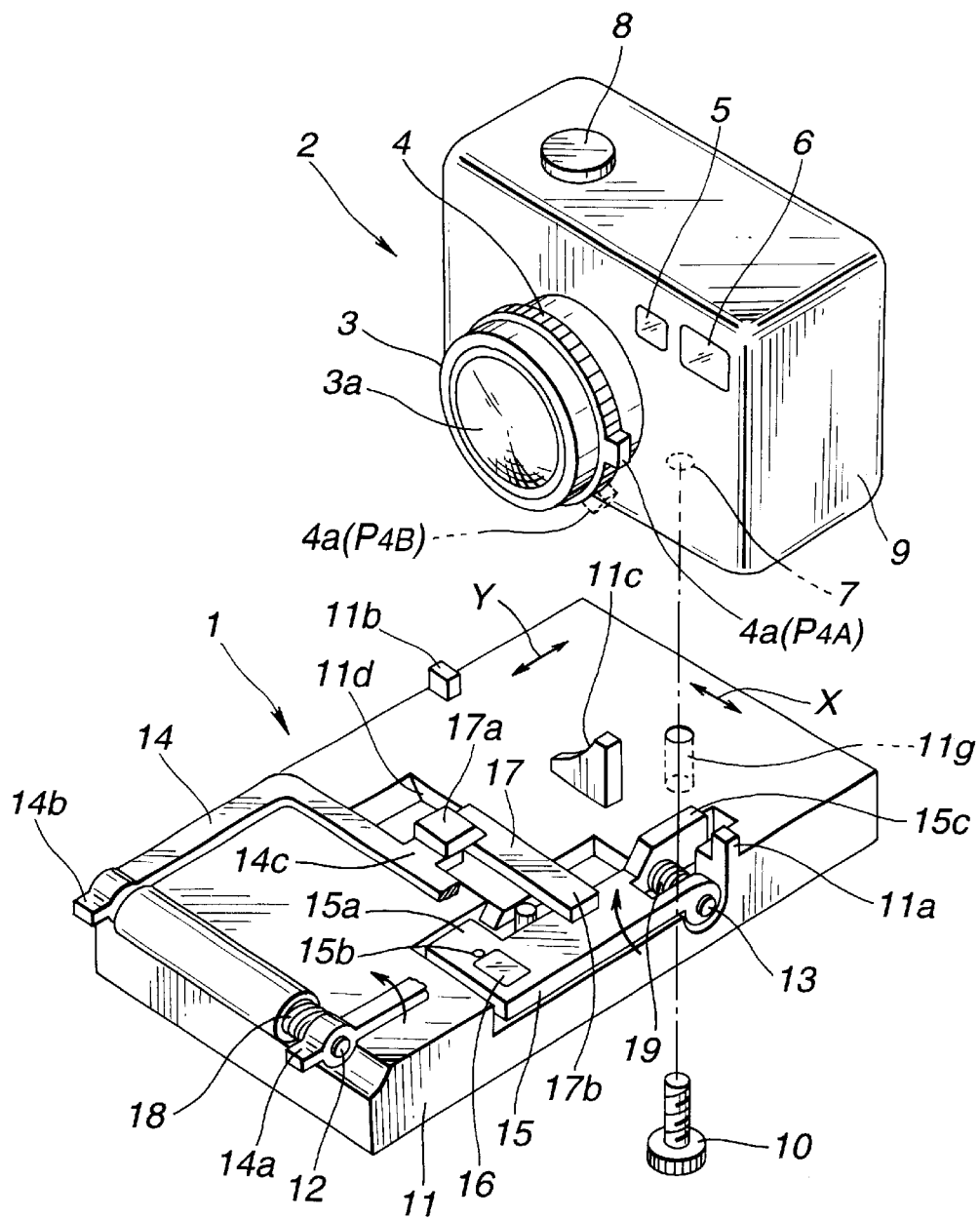
FIG. 1 is an oblique view of the first embodiment of the present invention showing a nearby photography adapter (hereinafter, a photography adapter), of which components are stowed, and an unmounted camera.
Figure 2:
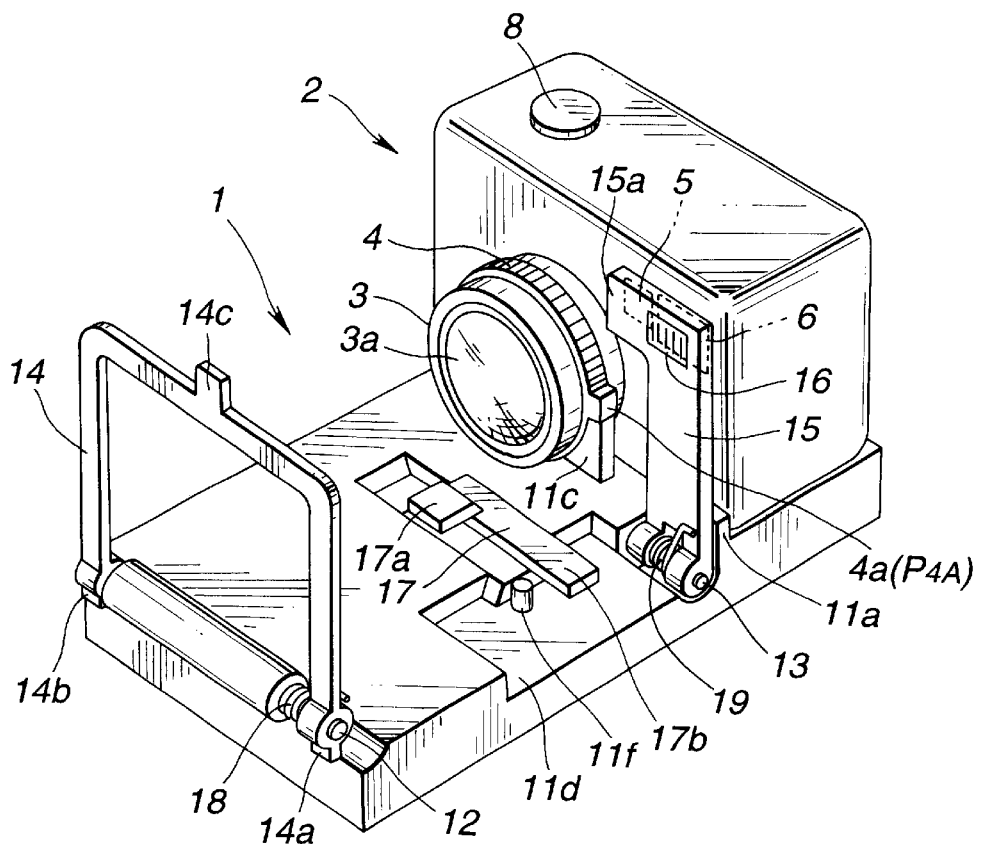
FIG. 2 is an oblique view showing the photography adapter shown in FIG. 1 on which the camera is mounted.
Figure 3:
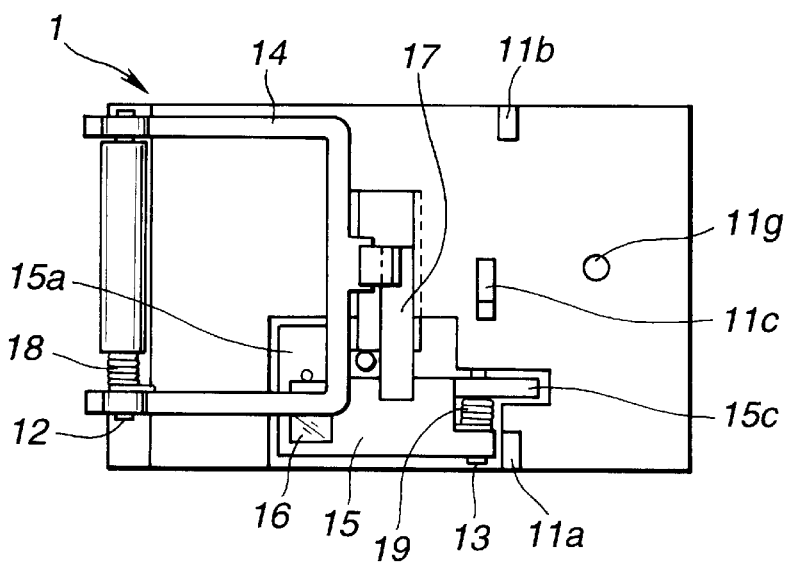
FIG. 3 is a plan view showing the photography adapter shown in FIG. 1 of which components are stowed.
Figure 4:
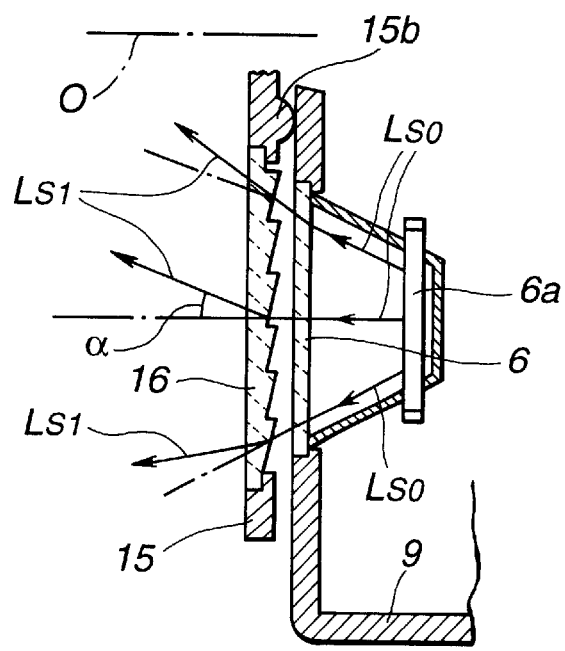
FIG. 4 is a lateral sectional view showing a flashlight correcting sheet of an auxiliary plate, which is employed in the photography adapter shown in FIG. 1, a strobe lighting device, and their surroundings.
Figure 5:
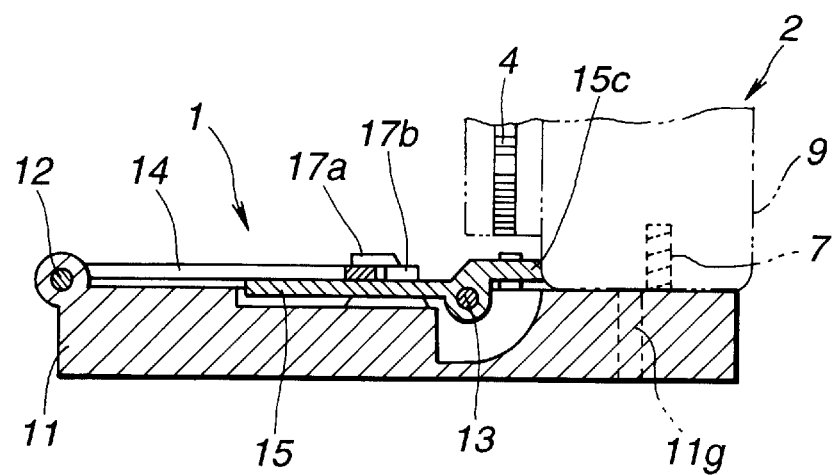
FIG. 5 is a longitudinal sectional view showing the photography adapter shown in FIG. 1 of which components are stowed and which cannot be attached to the camera.
Figure 6:
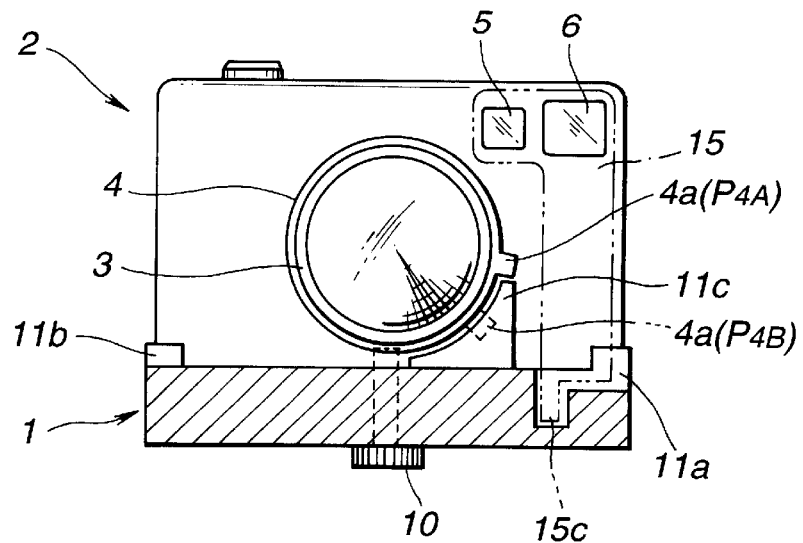
FIG. 6 is a longitudinal sectional view showing the photography adapter shown in FIG. 1 and mounted on the camera.

FIG. 1 is an oblique view showing a nearby photography adapter (hereinafter a photography adapter) of the first embodiment of the present invention, and a camera that has not been mounted on the photography adapter. FIG. 2 is an oblique view showing the photography adapter and the camera mounted on the photography adapter. FIG. 3 is a plan view in which the elements of the photography adapter are collapsed. FIG. 4 is a lateral sectional view showing a flashlight correcting sheet of an auxiliary plate included in the photography adapter and its surroundings while flashlight is being irradiated. FIG. 5 is a longitudinal sectional view showing the photography adapter whose components are collapsed and which cannot be attached to a camera. FIG. 6 is a longitudinal sectional view showing the photography adapter attached to the camera from the frontal side.

A photography adapter 1 of this embodiment is attachable and detachable to and from a camera 2. When the photography adapter 1 is attached to the camera 2, nearby photography can be carried out at a shorter camera-to-subject distance than normal photography.

The camera 2 to which the photography adapter 1 is attached includes, as shown in FIG. 1 and others, a lens frame 3 and a strobe lighting window 6. The lens frame 3 holds a photographic lens 3a on the face of a camera body 9. A viewfinder window 5 and strobe lighting device are incorporated inside the strobe lighting window 6. A release button 8 is formed on the top of the camera body 9. A tripod locking screw 7 is threaded in the bottom of the camera body 9.

The lens frame 3 bears a distance ring 4 that can be turned in order to determine a distance of the photographic lens 3a to a subject. The distance ring 4 is provided with a manipulation knob 4a. The manipulation knob 4a can be turned to a normal photographic range P4B and a nearby photographic (macro zoom photographic) position P4A. With the manipulation knob 4a set within the normal photographic range P4B, the photographic lens 3a is positioned within a range permitting normal photography. With the manipulation knob 4b set to the nearby photographic position P4A, the photographic lens 3a is positioned for nearby photography in which photography is performed at a nearer distance than normal photography.

The photography adapter 1 comprises a base plate 11, a photographic range and camera-to-subject distance indicating frame 14, an auxiliary plate 15, and a locking plate 17. The base plate 11 is a mount member. The photographic range and camera-to-subject distance indicating frame 14 is a photographic range and camera-to-subject distance indicating member for indicating a photographic range and an in-focus position for a subject which are set for nearby photography. The photographic range and camera-to-subject distance indicating frame 14 is engaged with a supporting shaft 12 fixed to the base plate 11 so that the indicating frame 14 can turn freely. The photographic range and camera-to-subject distance indicating frame 14 is thus supported by the supporting shaft 12 so that the indicating frame 14 can be collapsed. The auxiliary plate 15 is engaged with a supporting shaft 13 fixed to the base plate 11 so that the plate 15 can turn freely. The auxiliary plate 15 is thus supported by the supporting shaft 13 so that the plate 15 can be collapsed. The locking plate 17 is a member for retaining the indicating frame 14 and auxiliary plate 15 at collapsed positions (See FIG. 1) at which they are stowed. The locking plate 17 is borne in a dovetail groove 11d in the base plate 11 so that the locking plate 17 can slide freely.

The base plate 11 has projections 11a and 11b, a distance knob interfering projection 11c serving as a photographic state sensing member, the dovetail groove 11d, and an attachment hole 11g. When the camera 2 is mounted, the projections 11a and 11b abut the camera body 9 and help align the camera body 9 in the Y direction. When the distance ring 4 on the lens frame 3 lies within the normal photographic range P4B outside the normal photographic position P4A, the distance knob interfering projection 11c interferes with the distance knob 4a of the distance ring. This disables mounting of the camera body 9 on the base plate 11. The locking plate 17 is inserted into the dovetail groove 11d so that the locking plate 17 can slide freely. A locking screw 10 for locking the camera 2 when meshed with the tripod locking screw 7 is inserted into the attachment hole 11g.

The locking plate 17 includes a presser portion 17a and a presser portion 17b. The presser portion 17a presses a jut 14c to retain the photographic range and camera-to-subject distance indicating frame 14 at its collapsed position. The presser portion 17b retains the auxiliary plate 15 at its collapsed position. The locking plate 17 that can slide in the X directions is constrained to move in an X direction (leftward) by a spring that is not shown. The locking plate 17 is slid in an X direction (rightward) against the constraining force until it abuts a stopper 11f. The photographic range and camera-to-subject distance indicating frame 14 and auxiliary plate 15 are held down and retained at the collapsed positions (stowed as shown in FIG. 1). The photographic range and camera-to-subject distance indicating frame 14 and auxiliary plate 15 are sustained by a click stop mechanism that is not shown.

Moreover, when the locking plate 17 is slid in the X direction (leftward), the photographic range and camera-to-subject distance indicating frame 14 is released first. The auxiliary plate 15 is then released. The photographic range and camera-to-subject distance indicating frame 14 and auxiliary plate 15 are turned to stand erect from being stowed (See FIG. 2) owing to the constraining force exerted by springs 18 and 19. Herein, when the photographic range and camera-to-subject distance indicating frame 14 is standing erect, it is usable. The photographic range and camera-to-subject distance indicating frame 14 and auxiliary plate 15 need not always be turned by utilizing the constraining force exerted by the springs 18 and 19. Namely, they may be raised manually.

Furthermore, when the locking plate 17 is slid leftward, the auxiliary plate 15 is unlocked first. The photographic range and camera-to-subject distance indicating plate 14 is then unlocked. If the adapter is structured this way, the photographic range and camera-to-subject distance indicating frame 14 and auxiliary plate 15 can be set to their usable states reliably.

The photographic range and camera-to-subject distance indicating frame 14 is designed to be larger than a photographic range. When the photographic range and camera-to-subject distance indicating frame 14 is standing erect, the inside of the indicating frame indicates a photographic range set for nearby photography. The position at which the indicating frame stands erect coincides with an in-focus position for a subject set for nearby photography. The indicating frame 14 has the jut 14c by to which the indicating frame 14 is retained at the collapsed position by the locking plate 17. The indicating frame 14 has stoppers 14a and 14b that, when the indicating frame 4 is raised, abut the base plate 11. The indicating frame 4 is constrained to move to stand erect from being collapsed by means of the spring 18.

The auxiliary plate 15 has a viewfinder window cover portion 15a, a flashlight correcting sheet 16, an abutment boss 15b, and an interfering projection 15c. The viewfinder window cover portion 15a is part of the distal portion of the auxiliary plate 15 serving as a demonstrating member. When the auxiliary plate 15 is standing erect, the viewfinder window cover portion 15a blocks the viewfinder window 5 to disable viewing through the viewfinder. The viewfinder window cover portion 15a thus indicates that the photography adapter 1 has been attached and becomes usable. The flashlight correcting sheet 16 is attached to the distal portion of the auxiliary plate 15 and serves as a flashlight correcting member. When the auxiliary plate 15 is raised, the flashlight correcting sheet 16 is opposed to the strobe lighting window 6. The flashlight correcting sheet 16 then corrects a range irradiated by the strobe lighting device so that a range of nearby photography will be illuminated homogeneously. The abutment boss 15b is located by the side of the viewfinder cover portion 15a and designed to impinge on the camera body. The interfering projection 15c is located near the axis of rotation. When the auxiliary plate 15 is collapsed, the interfering projection 15c interferes with the camera body 9 to disable mounting of the camera body.

The auxiliary plate 15 is constrained to turn so as to stand erect from being collapsed by means of the spring 19.

Moreover, when the auxiliary plate 15 has turned to stand erect, the abutment boss 15b impinge on the face of the camera body 9. The position at which the auxiliary plate 15 stands erect is therefore determined uniquely.

The flashlight correcting sheet 16 is realized with a deflecting micro-prism. As shown in FIG. 4, when the auxiliary plate 15 is standing erect (usable), the flashlight correcting sheet 16 is located in front of the strobe lighting window 6 having the strobe lighting device 6a inside. Flashlight LSO emanating from the strobe lighting device 6a is irradiated to a subject along the optical axis O of the photographic lens during normal photography. The flashlight is refracted by an angle of deflection α towards the optical axis O, at which a nearby subject is positioned, by means of the deflecting micro-prism. The flashlight is then irradiated as corrected flashlight LS1.

Next, a description will be provided for an action of attaching the photography adapter of this embodiment having the foregoing components to a camera.

When the auxiliary plate 15 is locked by the locking plate 17 and thus collapsed as shown in FIG. 1 or FIG. 3, the photographic range and camera-to-subject distance indicating frame 14 is collapsed by the locking plate 17. Even if an attempt is made to attach the photography adapter 1 in this state to the camera 2, the interfering projection 15c of the auxiliary plate 15 interferes with the front edge of the camera body 9 as shown in the sectional view of FIG. 5. The locking screw 10 cannot therefore be inserted into the tripod locking screw 7 threaded in the camera body 9 by way of the attachment hole 11g. Consequently, the photography adapter 1 cannot be attached to the camera 2.

Moreover, assume that the distance ring 4 on the lens frame 3 of the camera 2 is not set to the nearby photographic position, that is, assume that the manipulation knob 4a is located within the normal photographic range P4B. In this case, even if an attempt is made to attach the photography adapter 1 to the camera 1 for performing nearby photography, the distance knob interfering projection 11c on the base plate 11 interferes with the manipulation knob 4a. The camera body 9 cannot therefore be mounted on the base plate 11.

For performing nearby photography, the distance ring 4 on the lens frame 3 of the camera 2 is turned to the nearby photographic position P4A. The locking plate 17 of the photography adapter 1 is slid so that the photographic range and camera-to-subject distance indicating frame 14 and auxiliary plate 15 will turn to become raised. In this state, as shown in the sectional view of FIG. 6, the photography adapter 1 can be attached to the camera body 9 using the locking screw 10. Thus, the camera is mounted on the photography adapter.

Moreover, when the photography adapter 1 is fully attached to the camera 2, the viewfinder window 5 is blocked by the viewfinder window cover portion 15a of the auxiliary plate 15. When a photographer views through the viewfinder, he/she will find it dark. The photographer can thus recognize that the photography adapter 1 has been attached normally.

Moreover, when nearby photography is performed as stroboscopic photography, the photography adapter 1 is attached to the camera. The auxiliary plate 15 is raised, and the flashlight correcting sheet 16 is located in front of the strobe lighting window 6. Flashlight is, as shown in FIG. 4, refracted towards the optical axis O of the photographic lens, that is, towards the center of the face of the camera. The flashlight is thus irradiated towards the photographic range and camera-to-subject distance indicating frame 14 where a subject to be photographed by nearby photography is positioned.

For collapsing and thus stowing the photographic range and camera-to-subject distance indicating frame 14 and the auxiliary plate 15, the auxiliary plate 15 is collapsed first. Thereafter, the photographic range and camera-to-subject distance indicating frame 14 is collapsed and stowed so that it will be overlaid on part of the auxiliary plate 15. When the photographic range and camera-to-subject distance indicating frame 14 and auxiliary plate 15 are collapsed in that order, if the photography adapter 11 must be used, the photographic range and camera-to-subject distance indicating frame 14 is raised first. Thereafter, the auxiliary plate 15 is raised. Unless these components are handled intentionally unnaturally, as long as the auxiliary plate 15 is standing erect, the photographic range and camera-to-subject distance indicating frame 14 is standing erect. Therefore, as mentioned above, when the photography adapter 1 is attachable to the camera 2, the auxiliary plate 15 is standing erect and the photographic range and camera-to-subject distance indicating frame 14 is standing erect. Consequently, the photography adapter 1 is usable.

As mentioned above, when the photography adapter 1 of this embodiment is adopted, nearby photography may be performed using the photography adapter 1. In this case, the lens frame 3 is set to a nearby photography enabled state. The photography adapter 1 fully set to the usable state can now be attached to the camera 2. It can be recognized reliably whether the photography adapter 1 has been attached normally. If the distance ring 4 is not set to the nearby photography mode or if the photography adapter 1 is imperfectly set up, the photography adapter cannot be attached to the camera. Incorrect handling can thus be prevented.

Moreover, when nearby photography is performed with stroboscopic photography, flashlight is irradiated centered on the photographic range and camera-to-subject distance indicating frame 14 where a nearby subject is positioned. Insufficient light or a phenomenon in which the indicating frame creates a shadow on a subject can be prevented.

Incidentally, in the aforesaid embodiment, the state of the photographic lens is detected based on the position of the manipulation knob 4a projecting from the distance ring 4 of the camera. Alternatively, a concave part may be formed in the distance ring and the position of the concave part may be detected. In this case, the distance knob interfering projection 11c serving as a state-of-photographic lens detecting member has a convex part to be fitted into the concave part.

Next, a nearby photography adapter (hereinafter a photography adapter) 21 in accordance with the second embodiment of the present invention will be described below.

As far as the aforesaid photography adapter 1 is concerned, even when the photographic range and camera-to-subject distance indicating frame 14 is collapsed and thus stowed, the auxiliary plate 15 alone can be raised. Thus, even when the photography adapter 1 is imperfectly set up, it can be attached to the camera.

Moreover, the distance knob interfering projection 11c serving as the state-of-photographic lens detecting member is formed as an integral part of the base plate 11. Even when the photographic range and camera-to-subject distance indicating frame 14 and auxiliary plate 15 are collapsed and thus stowed, the distance knob interfering projection 11c projects upward. The photography adapter 1 has a drawback of poor portability attained with the components stowed.

The photography adapter 21 of the second embodiment attempts to overcome the foregoing drawbacks. Even when either of the photographic range and camera-to-subject distance indicating frame and auxiliary plate is collapsed, the photography adapter 21 cannot be attached to the camera 2. Furthermore, the distance knob interfering projection is formed as an integral part of the auxiliary plate. When the auxiliary plate is collapsed, the distance knob interfering projection is stowed responsively.

Figure 7:
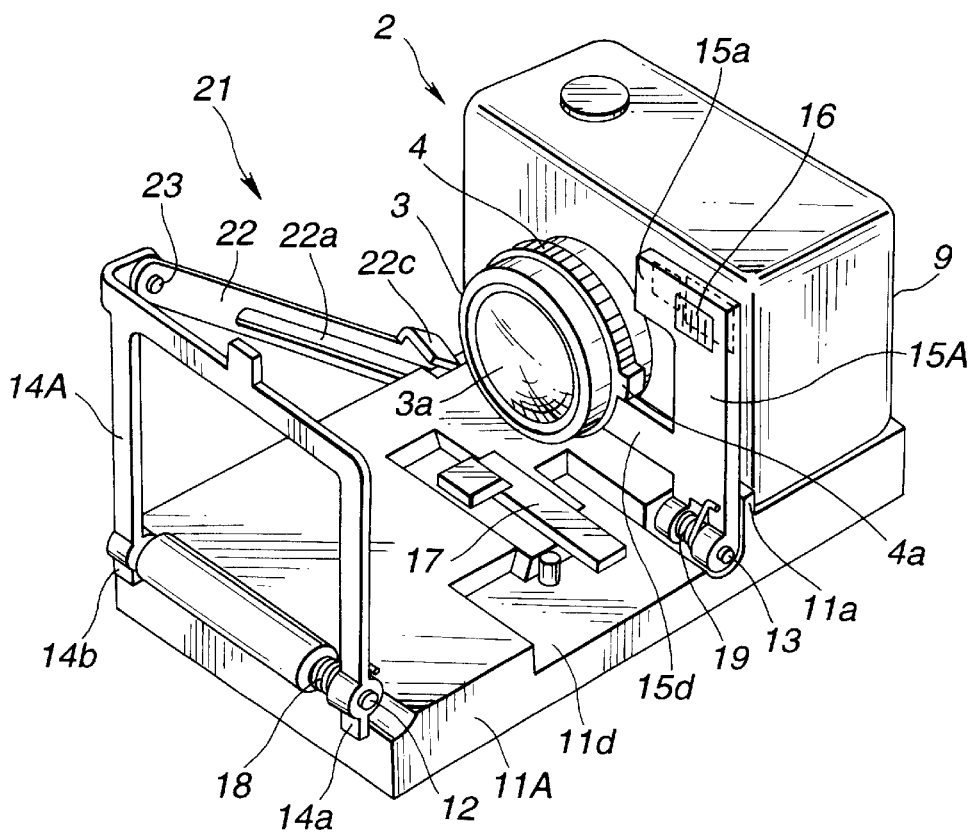
FIG. 7 is an oblique view showing a photography adapter in accordance with the second embodiment of the present invention which is attached to a camera.
Figure 8:
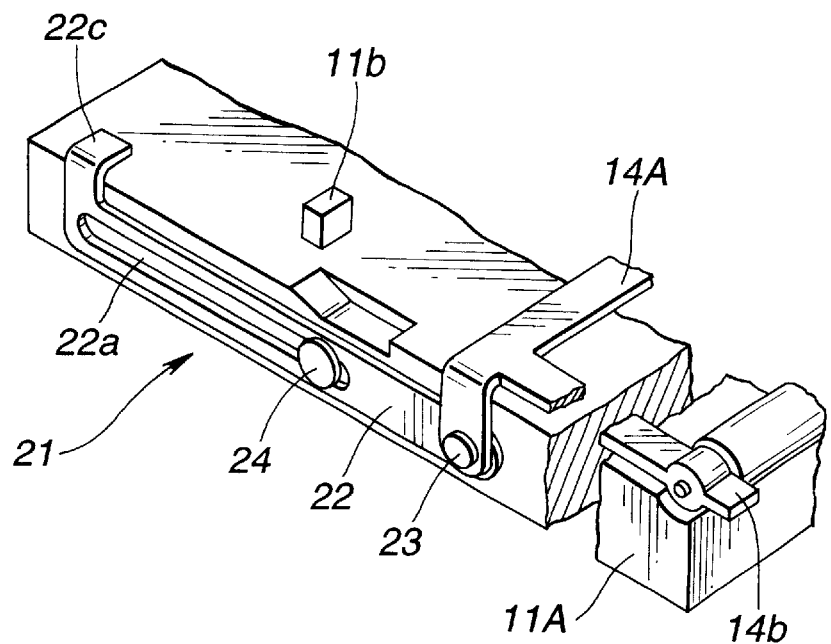
FIG. 8 is an oblique view showing the photography adapter shown in FIG. 7, which has components thereof stowed, from the side of an interlocking plate.
Figure 9:
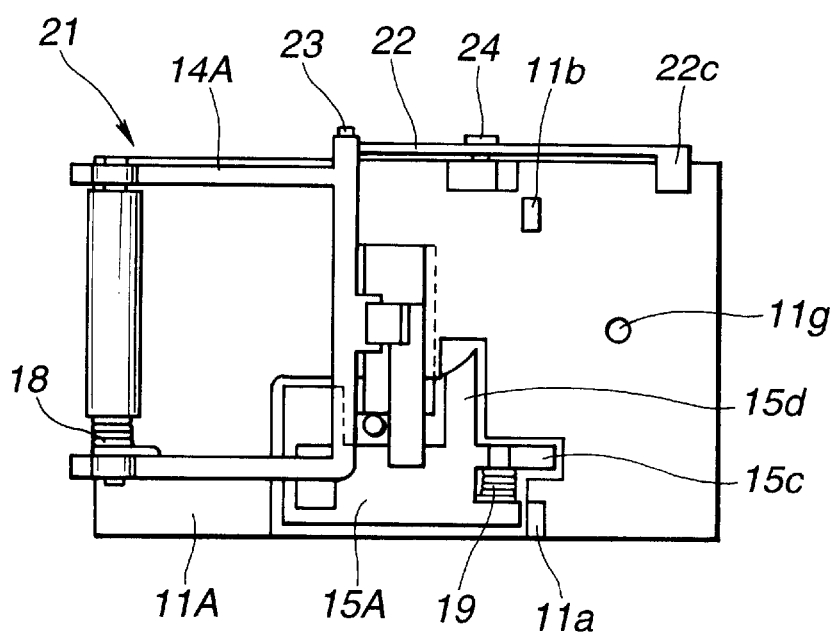
FIG. 9 is a plan view showing the photography adapter shown in FIG. 7 having components thereof stowed.

FIG. 7 is an oblique view of the photography adapter 21 of the second embodiment which is attached to a camera. FIG. 8 is an oblique view of an interlocking plate 22 and its surroundings with a photographic range and camera-to-subject distance indicating frame collapsed. FIG. 9 is a plan view showing the photography adapter 21 with the components stowed.

In the photography adapter 21, the interlocking plate 22 having a projection 22c is coupled to a photographic range and camera-to-subject distance indicating frame 14A. When the indicating frame 14A is collapsed, the camera body 9 interferes with the projection 22c. This hinders mounting of the camera 2. Moreover, a distance knob interfering jut 15d serving as a state-of-photographic lens detecting member is formed as an integral part of an auxiliary plate 15A. The distance knob interfering jut 15d is substituted for the distance knob interfering projection 11c formed on the base plate 11. The auxiliary plate 15A can thus be stowed neatly. The other components of the photography adapter 21 are identical to those of the photography adapter 1 of the first embodiment shown in FIG. 1. The identical components will be described by assigning the same reference numerals thereto.

The structures of components different from that of the adapter of the first embodiment will be explained in detail. To begin with, a supporting pin 23 is attached to the left upper edge of the photographic range and camera-to-subject distance indicating frame 14A. The interlocking plate 22 is supported by the supporting pin 23 so that the interlocking plate 22 can pivot freely. A guide groove 22a is cut in the interlocking plate 22. The projection 22c projects from the interlocking plate 22 above the base plate. The guide groove 22a is engaged with a guide pin 24 fixed to the flank of the base plate, whereby the interlocking plate 22 can slide freely.

When the photographic range and camera-to-subject distance indicating frame 14A is collapsed, the interlocking plate 22 is, as shown in FIG. 8, located parallel to the base plate 11A. The interlocking plate 22 is retained with the projection 22c projecting above the top of the base plate 11A. When the photographic range and camera-to-subject distance indicating frame 14A is collapsed, the camera body 9 interferes with the projection 22c. This hinders attachment of the photographic adapter 21. When the photographic range and camera-to-subject distance indicating frame 14A is standing erect and usable, the interlocking plate 22 has one end thereof raised. The projection 22c is, as shown in FIG. 7, moved to a position at which it will not interfere with the camera body 9 during mounting of the camera body. The auxiliary plate 15A to be described later is standing erect. The photography adapter 21 is therefore attachable.

Moreover, the photography adapter 21 has the auxiliary plate 15A borne by the base plate 11A so that the auxiliary plate can turn freely. The auxiliary plate 15A has the viewfinder window cover portion 15a and the flashlight correction sheet 16 as well as the distance knob interfering jut 15d. When the auxiliary plate 15A is standing erect, and the distance knob 4a of the mounted camera 2 is set to the normal photographic range P4B. Mounting the camera 2 is disabled. Moreover, when the distance knob 4b is set to the nearby photographic position P4A, mounting the camera 2 is enabled.

When the auxiliary plate 15A is collapsed, the operation of disabling or enabling mounting of a camera depending on the position of the distance knob 4a will not be provided. However, when the auxiliary plate 15A is collapsed, the interfering jut 15c of the auxiliary plate 15A interferes with the front edge of the camera body 9 in the same manner as that in the first embodiment. This disables mounting of the camera 2.

According to the photography adapter 21 of the second embodiment, when either of the photographic range and camera-to-subject distance indicating frame 14A and auxiliary plate 15A is collapsed, the photography adapter 21 cannot be attached to the camera 2. In other words, when the photography adapter 21 is imperfectly set up, it cannot be attached to the camera. A mistake will not be made in attachment. Furthermore, the distance knob interfering jut 15d is formed as an integral part of the auxiliary plate 15A. The distance knob interfering jut 15d can thus be stowed with the auxiliary plate 15A collapsed. This leads to improved portability.

Next, a description will be made of variants of the flashlight correcting sheet 16, which is a flashlight correcting member, employed in the photography adapters of the first and second embodiments.

Figure 10:
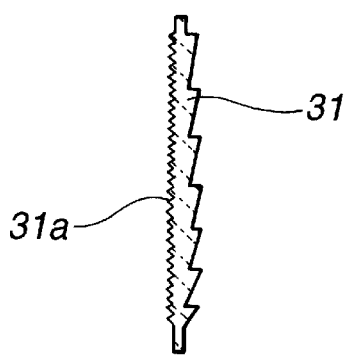
FIG. 10 is a lateral sectional view of the first variant of the flashlight correcting sheet employed in the photography adapters shown in FIG. 1 and FIG. 7.

FIG. 10 is a sectional view of a flashlight correcting sheet 31 that is the first variant of the flashlight correcting sheet 16. The flashlight correcting sheet 31 is realized with a deflecting micro-prism whose outer surface located farther from the photographic lens offers a larger angle of deflection. The surface of the flashlight correcting sheet 31 on the side of a subject is a diffusing surface 31a.

According to the flashlight correcting sheet 31 of the first variant, flashlight passing away from the optical axis O of lenses is deflected towards the center of the camera body. The flashlight is thus irradiated to the inside of the photographic range and camera-to-subject distance indicating frame without waste. At the same time, the flashlight is diffused in order to suppress irregularity of the flashlight.

Figure 11:
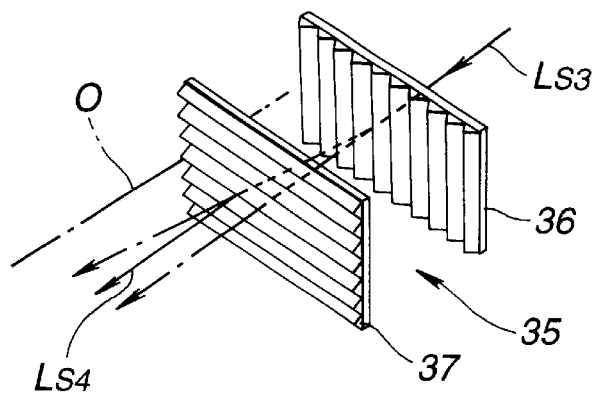
FIG. 11 is an oblique view of the second variant of the flashlight correcting sheet employed in the photography adapters shown in FIG. 1 and FIG. 7.

FIG. 11 is an oblique view of a flashlight correcting sheet 35 that is the second variant of the flashlight correcting sheet 16. The flashlight correcting sheet 35 is composed of two deflecting micro-prisms, that is, a deflecting micro-prism 36 for deflecting light in horizontal directions and a deflecting micro-prism 37 for deflecting light in vertical directions. Flashlight LS3 is refracted in horizontal directions (leftward) towards the optical axis O of the photographic lens by means of the deflecting micro-prism 36. The flashlight LS3 is further refracted in vertical directions (downward) towards the optical axis O of the photographic lens by means of the deflecting micro-prism 37. Consequently, the flashlight is irradiated as corrected flashlight LS4 obliquely downward towards the optical axis O of the photographic lens.

According to the flashlight correcting sheet 35 of the second variant, flashlight can be irradiated efficiently to a subject positioned nearby during nearby photography.

Figure 12:
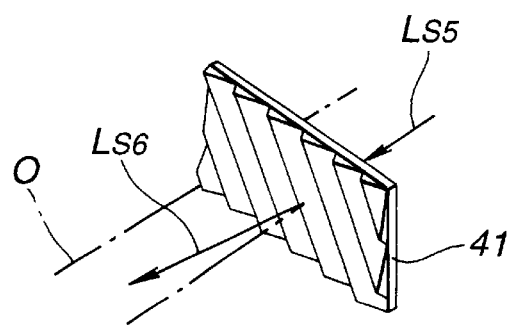
FIG. 12 is an oblique view of the third variant of the flashlight correcting sheet employed in the photography adapters shown in FIG. 1 and FIG. 7.

FIG. 12 is an oblique view of a flashlight correcting sheet 41 that is the third variant of the flashlight correcting sheet 16. The flashlight correcting sheet 41 is realized with a deflecting micro-prism for deflecting light obliquely downward. Flashlight LS5 is refracted obliquely downward towards the optical axis O of the photographic lens by means of the deflecting micro-prism, and irradiated as irradiated flashlight LS6.

According to the flashlight correcting sheet 41 of the third variant, flashlight can be irradiated efficiently to the inside of the photographic range and camera-to-subject distance indicating frame during nearby photography.

Figure 13:
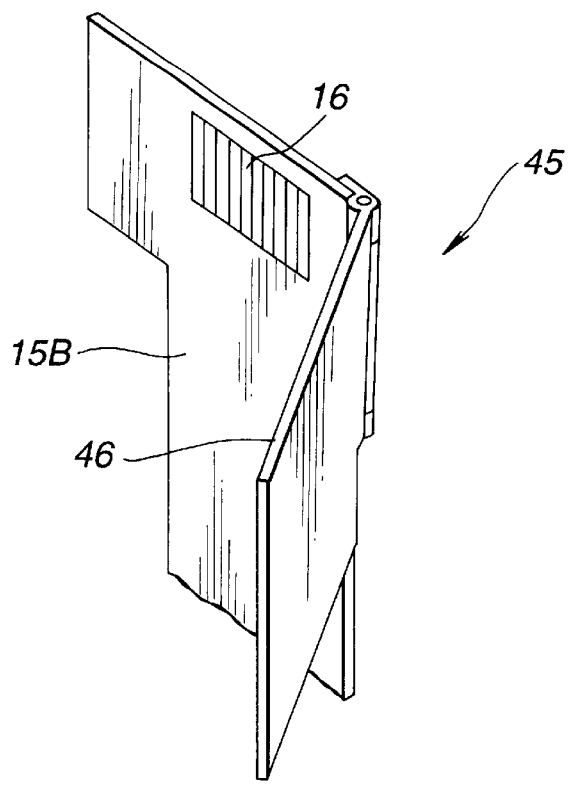
FIG. 13 is an oblique view of the fourth variant of the flashlight correcting sheet employed in the photography adapters shown in FIG. 1 and FIG. 7.
Figure 14:
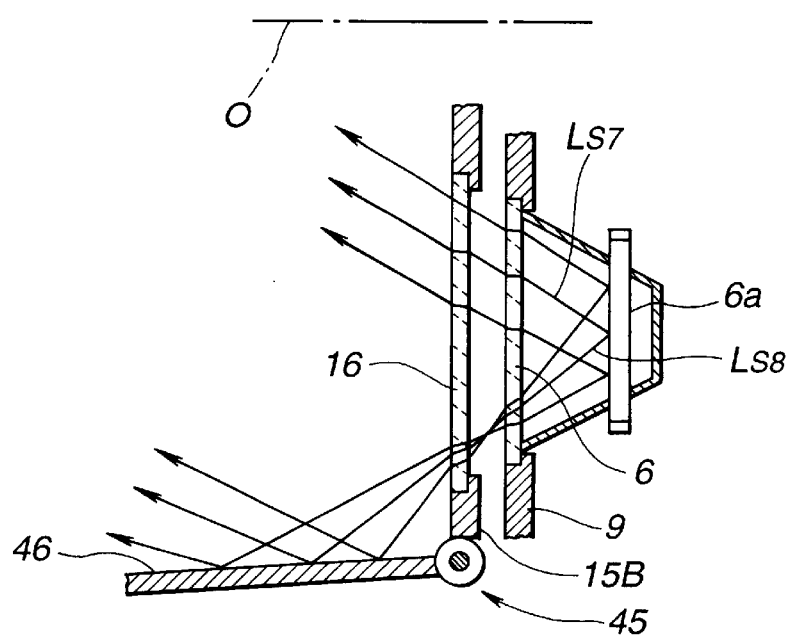
FIG. 14 is a lateral sectional view of the flashlight correcting sheet shown in FIG. 13.

FIG. 13 is an oblique view of a flashlight correcting unit 45 that is the fourth variant of the flashlight correcting sheet 16. FIG. 14 is a lateral sectional view of the flashlight correcting unit 45 to which flashlight is irradiated. The flashlight correcting unit 45 is composed of a flashlight correcting sheet 16 and a sheet reflector 46. The flashlight correcting sheet 16 is the one employed in the first embodiment. The flashlight correcting sheet 16 is incorporated in an auxiliary plate 15B that is fixed to the base plate 11 so that it can be freely turned be collapse or raised. The sheet reflector 46 having an evaporated mirror-finished surface is supported by the auxiliary plate 15B so that a sector position or a position to which the sheet reflector is turned can be adjusted.

As far as the flashlight correcting unit 45 of this variant is concerned, flashlight is emitted from the strobe lighting device 6a. Out of the flashlight, flashlight LS7 traveling towards the optical axis O of lenses is refracted towards the optical axis O of lenses by means of the flashlight correcting sheet 16. Moreover, flashlight LS8 emitted outward of the sheet reflector 46 is reflected towards the optical axis O of lenses by means of the sheet reflector 46.

According to the flashlight correcting unit 45 of the fourth variant, flashlight can be irradiated efficiently to a subject positioned nearby during nearby photography. Alternatively, the sheet reflector 46 may have a satin-finished reflecting surface or an irregular reflecting surface.

Figure 15:
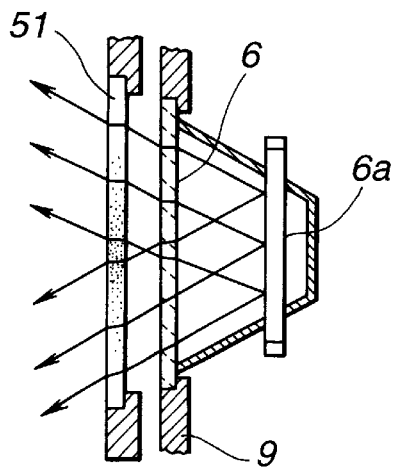
FIG. 15 is a lateral sectional view showing a correcting sheet that is the fifth variant of the flashlight correcting sheet employed in the photography adapters shown in FIG. 1 and FIG. 7, and its surroundings, while flashlight is being irradiated.
Figure 16:
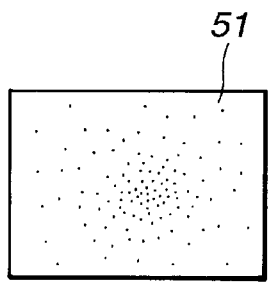
FIG. 16 is an enlarged front view of the flashlight correcting sheet shown in FIG. 15.

FIG. 15 is a lateral sectional view of the fifth variant of the flashlight correcting sheet 16, showing a flashlight correcting sheet 51 and its surroundings to which flashlight is irradiated. FIG. 16 is an enlarged front view of the flashlight correcting sheet 51. The flashlight correcting sheet 51 of this variant may be realized with an ND filter that reduces the overall light intensity and has the transmittance for flashlight varied from position to position. Otherwise, the flashlight correcting sheet 51 may be realized with a diffusing plate. Many dots each of whose concentration is constant, are arranged in the center of the correcting sheet on which the distribution of flashlight is highly concentrated, thus homogenizing the illuminance of flashlight falling on the whole surface of the correcting sheet.

According to the flashlight correcting sheet 51 of the fifth variant, the amount of flashlight is homogenized over the whole surface of the flashlight correcting sheet 51. Flashlight free from irregularity is irradiated to the inside of the photographic range and camera-to-subject distance indicating frame during nearby photography. An electrochromic device having the transmittance thereof varied may be adopted as the flashlight correcting sheet 51.

Figure 17:
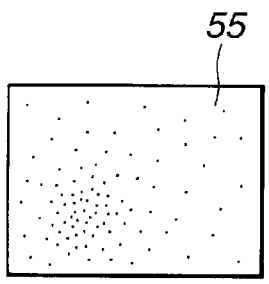
FIG. 17 is an enlarged front view of the sixth variant of the flashlight correcting sheet employed in the photography adapters shown in FIG. 1 and FIG. 7.

FIG. 17 is an enlarged front view of a flashlight correcting sheet 55 that is the sixth variant of the flashlight correcting sheet 16. The flashlight correcting sheet 55 of this variant reduces, like the one of the fifth variant, the overall light intensity and has the transmittance of the flashlight varied from position to position. In this variant, however, flashlight is emitted from the strobe lighting device 6a through the strobe lighting window 6 with the flashlight correcting sheet 16 unmounted. The distribution of illuminance levels of flashlight is measured by photographing the inside of the indicating frame. An ND filter or diffusing sheet having the transmittance thereof varied inversely proportion to the measured distribution of illuminance levels of flashlight is created and adopted as the flashlight correcting sheet 55.

According to the flashlight correcting sheet 55 of the sixth embodiment, flashlight of a high illuminance level emitted from the strobe lighting device is corrected. Also, a drop in the amount of light occurring around the perimeter of the photographic lens is corrected. Thus, the illuminance of flashlight falling on the whole surface of the flashlight correcting sheet is homogenized efficiently. Consequently, flashlight free from irregularity can be irradiated efficiently to the inside of the photographic range and camera-to-subject distance indicating frame during nearby photography, and stroboscopic nearby photography can be achieved successfully.

Next, a description will be given for a variant of the viewfinder window cover portion 15a of the auxiliary plate employed in the photography adapters of the first and second embodiments.

Figure 18:
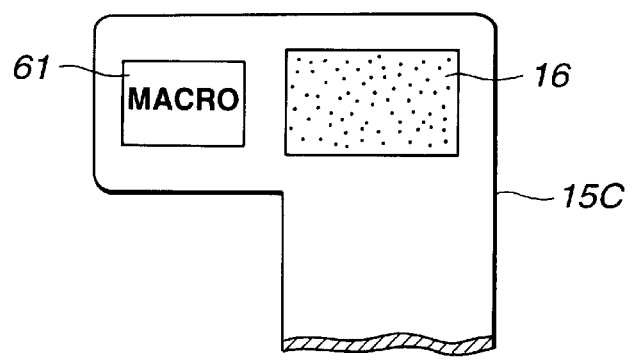
FIG. 18 is a front view showing the first variant of the viewfinder window cover portion of the auxiliary plate employed in the photography adapters shown in FIG. 1 and FIG. 7, and its surroundings.

FIG. 18 is a front view of a cover portion that is the first variant of the viewfinder cover portion 15a of the auxiliary plate. A viewfinder cover portion 61 of an auxiliary plate 15C of this variant is made by printing a label MACRO on a transparent member. When a viewfinder is viewed therethrough, it can be discerned that the nearby photography adapter is attached to the camera to enable nearby photography.

Moreover, a colored semi-transparent sheet may be used as a viewfinder cover portion of the second variant. In this variant, when a viewfinder is viewed therethrough, if the field of view offered by the viewfinder is colored, it can be discerned that the nearby photography adapter has been attached to the camera.

Figure 19:
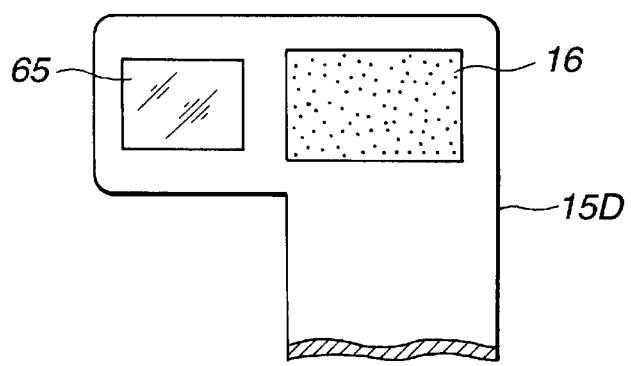
FIG. 19 is a front view showing a viewfinder light correcting window that is the third variant of the viewfinder window cover portion of the auxiliary plate employed in the photography adapters shown in FIG. 1 and FIG. 7, and its surroundings.
Figure 20:
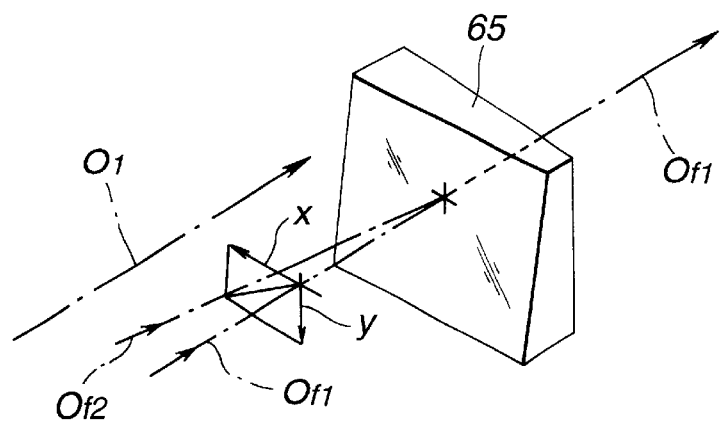
FIG. 20 is an oblique view showing refraction of light passing through a viewfinder caused by the viewfinder light correcting window shown in FIG. 19.

FIG. 19 is a front view of a viewfinder light correcting window and its surroundings. The viewfinder light correcting window is the third variant of the viewfinder window cover portion 15a of the auxiliary plate employed in the photography adapters of the first and second embodiments. FIG. 20 is an oblique view showing refraction of light passing through a viewfinder by the viewfinder light correcting window. A viewfinder light correcting window 65 of an auxiliary plate 15D of this variant is realized with a deflecting prism for correcting parallax caused by the viewfinder during nearby photography. As shown in FIG. 20, the ray axis Of1 of light passing through the viewfinder of a camera is reflected towards the optical axis Of2.

According to the viewfinder light correcting window 65 of the third variant, parallax occurring during nearby photography is corrected consequently, it becomes easy to view through the viewfinder.

Next, a description will be made of a variant of the auxiliary plate 15 employed in the photography adapters of the first and second embodiments.

Figure 21:
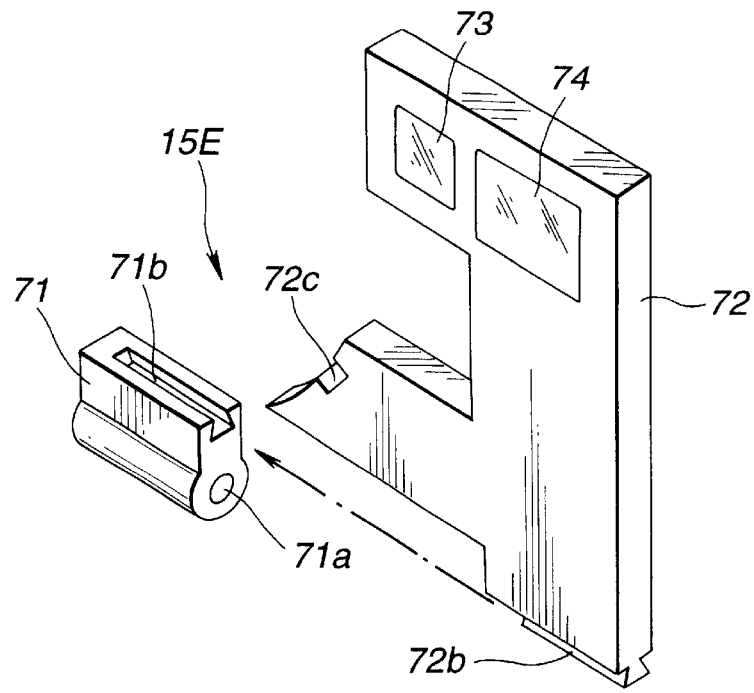
FIG. 21 is an exploded oblique view of an exchangeable auxiliary plate that is a variant of the auxiliary plate employed in the photography adapters shown in FIG. 1 and FIG. 7.

FIG. 21 is an exploded oblique view showing an auxiliary plate of a variant. The auxiliary plate 15E of the variant is composed of a turning supporting portion 71 and an exchangeable auxiliary plate 72. The exchangeable auxiliary plate 72 can slide to be exchangeable, thus enabling the photography adapter to be adapted to a plurality of photographic conditions including angle of view and camera-to-subject distance.

The turning supporting portion 71 has an axis-of-rotation hole 71a into which a supporting shaft of a base plate is inserted so that it can turn, and a dovetail groove 71b. The exchangeable auxiliary plate 72 has a projection 72b, a viewfinder window cover portion 73, a flashlight correcting sheet 74, and a notch 72c. The projection 72b is fitted into the dovetail groove 71b. The viewfinder window cover portion 73 is a demonstrating member. The flashlight correcting sheet 74 is a flashlight distributing member. The notch 72c is a state-of-photographic lens detecting member. The exchangeable auxiliary plate 72 is made available in a plurality of kinds that are mutually different in terms of the viewfinder window cover portion 73, flashlight correcting sheet 74, and notch 72c. The plurality of kinds of exchangeable auxiliary plates are associated with different types of designated photographic conditions including photographic range and camera-to-subject distance. Among the exchangeable auxiliary plates, an exchangeable auxiliary plate 72 conformable to a set of photographic conditions is selected, and is slid to be fitted into the turning supporting portion 71. The assembly is attached as the auxiliary plate 15E to a base plate. Thus, nearby photography or the like can be carried out.

According to the auxiliary plate 15E of this variant, any one of a plurality of exchangeable auxiliary plates 72 can be selected and fitted. This makes it possible to cope with a plurality of photographic conditions including camera-to-subject distance and the state of the photographic lens. Thus, nearby photography can be adapted to a wide range of applications.

Next, a description will be made of a variant of the photographic range and camera-to-subject distance indicating frame 14, of the photography adapter of the first embodiment.

Figure 22:
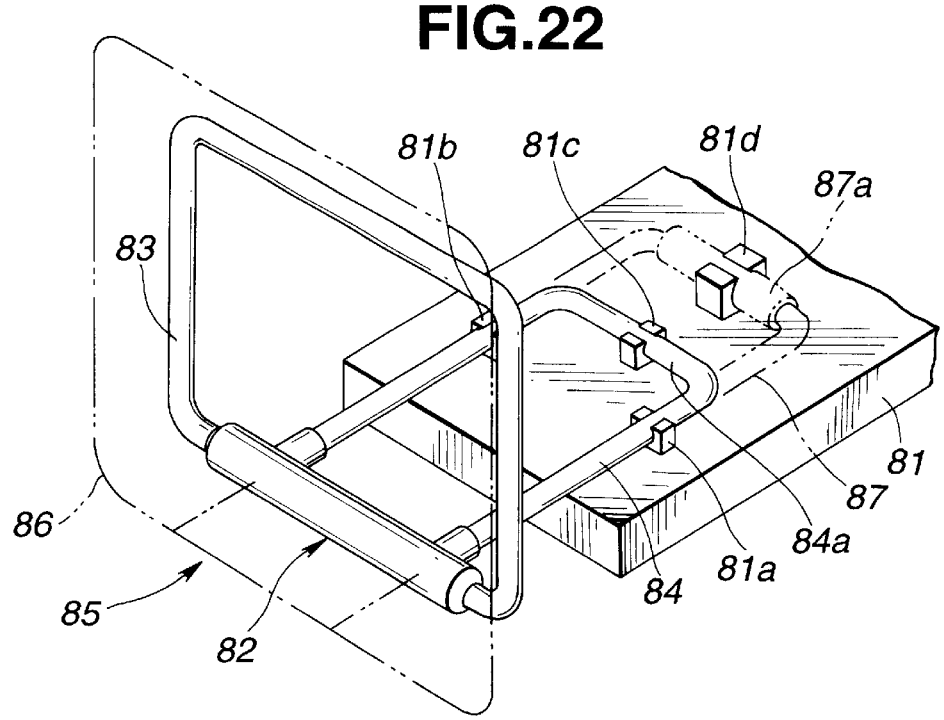
FIG. 22 is an oblique view of a variant of the photographic range and camera-to-subject distance indicating frame employed in the photography adapters shown in FIG. 1 and FIG. 7.

FIG. 22 is an oblique view showing a photographic range and camera-to-subject distance indicating frame of this variant. Two kinds of photographic range and camera-to-subject distance indicating frames 82 and 85 are adopted as the photographic range and camera-to-subject distance indicating frame of this variant. The photographic range and camera-to-subject distance indicating frames 82 and 85 are mutually different in terms of camera-to-subject distance for nearby photography and/or camera-to-subject distance. Either of the indicating frames 82 and 85 is selected and mounted on a base plate 81.

Formed on the base plate 81 relating to this variant are C-shaped rod fastening studs 81a and 81b and edge fastening studs 81c and 81d. The rod fastening studs 81a and 81b and edge fastening studs 81c and 81d can deform elastically for holding the photographic range and camera-to-subject distance indicating frames 82 and 85. The edge fastening studs 81c and 81d are mutually different in terms of the diameter of a rod to be fastened. A camera mounting portion, an auxiliary plate, and others are formed in the same manner as those in the aforesaid embodiment, though they are not shown.

The photographic range and camera-to-subject distance indicating frame 82 is composed of an indicating frame portion 83, a supporting rod 84, and a supporting edge 84a. The supporting rod 84 and edge 84a are engaged with the C-shaped rod fastening studs 81a and 81b and the edge fastening stud 81c. The supporting rod 84 and edge 84a are thus positioned and fastened.

On the other hand, the photographic range and camera-to-subject distance indicating frame 85 is composed of an indicating frame portion 86, a supporting rod 87, and a supporting edge 87a. The indicating frame portion 86 is different from the indicating frame portion 83 in terms of the size and the distance to a mounted frame portion. The supporting edge 87a is larger in diameter than the supporting edge 84a. The supporting rod 87 and supporting edge 87a are engaged with the C-shaped rod fastening studs 81a and 81b and the edge fastening stud 81d formed on the base plate 81. The supporting rod 87 and supporting edge 87a are thus fastened.

According to the photographic range and camera-to-subject distance indicating frames 82 and 85 of this variant having the foregoing structures, the indicating frame 82 or indicating frame 85 is selected according to the photographic conditions for nearby photography. The photographic conditions include photographic range and camera-to-subject distance. The indicating frame 82 or indicating frame 85 is thus mounted on the base plate 81. This enables nearby photography under various sets of photographic conditions including camera-to-subject distance.

In cameras to which the photography adapters 1 and 21 of the aforesaid embodiments can be adapted, the photographic conditions for nearby photography are designated by turning the distance ring 4. Photography adapters having similar structures may be attached to cameras having a zoom lens barrel so as to thus be adapted for zoom macro photography in which the conditions for nearby photography are designated by turning a zoom ring.

In the aforesaid embodiments and variants, nearby photography can be performed with or at an angle of view or a camera-to-subject distance that is different from that designated for normal photography. The present invention is not limited to nearby photography but can apply to a photography adapter enabling any other photography.

According to the nearby photography adapters of the aforesaid embodiments, the photographic state sensing member senses whether the adapter has been set to a nearby photographic state associated with the designated photographic conditions. When the photographic state sensing member senses that the adapter has been set, a camera can be mounted on the mount member. Unless the photographic lens meets the designated photographic conditions, the mount member cannot be mounted on a camera. Thus, when the photographic conditions are not met, even if an attempt is made to carry out nearby photography, the action would be prevented.

Moreover, when at least one of the photographic range and camera-to-subject distance indicating frame and auxiliary plate is collapsed, the photography adapter cannot be mounted on a camera. When preparations are made imperfectly, even if an attempt were made to carry out photography, the action would be prevented.

Furthermore, the photography adapter is mounted on a camera in order to perform stroboscopic nearby photography. The flashlight correcting member enables appropriate strobe lighting. Additionally, the flashlight correcting member can be collapsed and thus stowed. This is very convenient for transporting the photography adapter.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A nearby photography adapter attachable and detachable to and from a camera capable of performing nearby photography in which a camera-to-subject distance is shorter than that in normal photography, said adapter comprising:

a mount on which said camera can be mounted;

a photographic range and camera-to-subject distance indicator united with said mount, and movable between being collapsed and stowed and being raised and usable, said photographic range and camera-to-subject distance indicator indicating a photographic range and an in-focus position for a photographic subject of the camera, which are predetermined for nearby photography, when said indicator is raised; and a photographic state sensing member, united with said mount, for sensing whether said camera has been set to a predetermined nearby photographic state, and for, when said camera has been set to the predetermined nearby photographic state, enabling mounting of said camera on said mount.

2. A nearby photography adapter according to claim 1, wherein said photographic state sensing member senses whether a photographic lens has been moved to a position at a camera-to-subject distance defined for nearby distance defined separately from a range of camera-to-subject distances for normal photography.

3. A nearby photography adapter attachable and detachable to and from a camera capable of performing nearby photography in which a camera-to-subject distance is shorter than that in normal photography, said adaptor comprising:

a mount on which said camera can be mounted;

a photographic range and camera-to-subject distance indicator formed on said mount, and pivotable between being collapsed and stowed on said mount and being raised thereon and usable, said photographic range and camera-to-subject distance indicator indicating a photographic range and an in-focus position for a photographic subject of said camera, which are predetermined for nearby photography, when said indicator is raised; and a demonstrating member formed on said mount, and pivotable between being collapsed and stowed on said mount and being raised thereon, usable, and discernible through a viewfinder when mounting of the camera to the adapter has been achieved.

4. A nearby photography adapter according to claim 3, further comprising an attachment disabling mechanism for, when at least one of said photographic range and camera-to-subject distance indicator and said demonstrating member is collapsed, preventing attachment of said mount to said camera.

5. A nearby photography adapter attachable and detachable to and from a camera having a flashing lighting unit and capable of performing nearby photography in which a camera-to-subject distance is shorter than that in normal photography, said nearby adapter comprising:

a mount onto which said camera can be mounted; and a flashlight correcting member formed on said mount, and pivotable between being collapsed onto said mount and stowed and being raised thereon and usable, said flashlight correcting member being biased towards being raised, and said flashlight correcting member correcting either of a range of irradiation and an amount of irradiated light so that a photographic range set for nearby photography can be illuminated substantially homogeneously with an appropriate amount of light.

6. A nearby photography adapter attachable and detachable to and from a camera capable of performing nearby photography in which a camera-to-subject distance is shorter than that in normal photography, said adapter comprising:

a mount on which said camera can be mounted;

a photographic range and camera-to-subject distance indicator, formed on said mount, for indicating a photographic range and an in-focus position for a photographic subject which are predetermined for nearby photography; and a state-of photographic lens sensing member, formed on said mount, for sensing whether a photographic lens of said camera is set to a predetermined nearby photographic state, wherein when said state-of photographic lens sensing member senses that said photographic lens has been set to the nearby photographic state, mounting of said camera on said mount is enabled; and when the sensing member senses that said photographic lens is not set to the nearby photographic state, mounting of said camera on said mount is disabled.

7. A nearby photography adapter according to claim 6, wherein said photographic range and camera-to-subject distance indicator is movable between being collapsed and stowed on said mount and being raised thereon and usable.

8. A nearby photography adapter according to claim 6, wherein said state-of photographic lens sensing member is movable between being collapsed and stowed on said mount and being raised thereon and usable.

9. A nearby photography adapter according to claim 8, wherein when at least one of said photographic range and camera-to-subject distance indicator and said state-of-photographic lens sensing member sensor is collapsed and thus stowed on said mount, said nearby photography adapter cannot be attached to a camera.

10. A nearby photography adapter according to claim 7, further comprising a demonstrating member for demonstrating that said camera is mounted to the adapter when said demonstrating member can be seen through a viewfinder.

11. A nearby photography adapter according to claim 10, wherein said demonstrating member is formed on said mount, and movable between being collapsed and stowed and being raised, usable, and discernible through a viewfinder.

12. A nearby photography adapter according to claim 11, wherein when at least one of said photographic range and camera-to-subject distance indicator and said demonstrating member is collapsed and stowed on said mount, said nearby photography adapter cannot be attached to a camera.

13. A nearby photography adapter attachable and detachable to and from a camera capable of performing nearby photography in which a camera-to-subject distance is shorter than that in normal photography, said adapter comprising:

a mount on which said camera can be mounted;

a photographic range and camera-to-subject distance indicator formed on said mount, and movable between being collapsed and stowed on said mount and being raised thereon and usable, said photographic range and camera-to-subject distance indicator indicating a photographic range and an in-focus position for a photographic subject, which are predetermined for nearby photography, when raised;

a demonstrating member formed on said mount and movable between being collapsed and stowed on said mount and being raised thereon, usable, and discernible through a viewfinder when the camera is mounted to the adapter; and an attachment disabling mechanism for, when at least one of said photographic range and camera-to-subject distance indicator and said demonstrating member is collapsed and stowed, preventing attachment of said mount to a camera.

14. A nearby photography adapter attachable and detachable to and from a camera capable of performing nearby photography in which a camera-to-subject distance is shorter than that in normal photography, said adapter comprising:

a mount onto which said camera can be mounted; and a parallax corrector formed on said mount, and movable between being collapsed onto said mount and stowed and being raised thereon and usable, said parallax corrector positioned in the optical path of a viewfinder optical system when raised, and thus correcting a parallax caused by a viewfinder so that a predetermined nearby photographic state can be attained.

15. A nearby photography adapter according to claim 14, further comprising an attachment disabling mechanism for, when said parallax corrector is collapsed and stowed, disabling attachment of said mount to said camera.

16. A nearby photography adapter attachable and detachable to and from a camera that can perform nearby photography in which a camera-to-subject distance is shorter than that in normal photography, and that includes a flashing lighting unit thereon, said nearby photography adapter comprising:

a mount onto which said camera can be mounted; and an illumination light corrector formed on said mount, and movable between being collapsed and stowed onto said mount and being raised thereon and usable, said illumination light corrector lying within a zone irradiated by said flashing lighting unit when raised, and thus correcting a range of irradiation performed by said flashing lighting unit so that a nearby photographic range can be illuminated homogeneously.

17. A nearby photography adapter according to claim 16, further comprising a state-of-photographic lens sensing member for sensing whether a photographic lens of said camera has been set to a predetermined nearby photographic state, wherein only when said state-of-photographic lens sensing member senses that said photographic lens has been set to the nearby photographic state, attachment of said mount to said camera is enabled.

18. A nearby photography adapter according to claim 16, further comprising a photographic range and camera-to-subject distance indicator formed on said mount, and movable between being collapsed and stowed on said mount and being raised thereon and usable, wherein said photographic range and camera-to-subject distance indicator indicates a photographic range and an in-focus position for a subject, which are predetermined for nearby photography, when said indicator is raised.

19. A nearby photography adapter according to claim 16, further comprising a demonstrating member formed on said mount, and movable between being collapsed and stowed on said mount and being raised thereon, usable, and discernible through a viewfinder when the camera is mounted to the adapter.

20. A nearby photography adapter according to claim 16, further comprising a parallax corrector formed on said mount, and movable between being collapsed and stowed on said mount and being raised thereon and usable, wherein said parallax corrector lies on the optical path of a viewfinder optical system when standing erect, and thus corrects a parallax caused by a viewfinder so that a predetermined nearby photographic state can be attained.

21. A nearby photography adapter according to claim 16, further comprising:

a state-of-photographic lens sensing member, formed on said mount, for sensing whether a photographic lens of said camera has been set to a predetermined nearby photographic state;

a photographic range and camera-to-subject distance indicator formed on said mount, and movable between being collapsed and stowed on said mount and being raised thereon and usable, said photographic range and camera-to-subject distance indicator indicating a photographic range and an in-focus position for a photographic subject, which are predetermined for nearby photography, when raised;

a parallax corrector formed on said mount, which is movable between being collapsed and stowed on said mount and being raised thereon and usable, said parallax corrector being positioned in the optical path of a viewfinder optical system when raised, and thus correcting a parallax caused by a viewfinder so that a predetermined nearby photographic state can be attained; and an attachment disabling mechanism for, when at least one of said illumination light corrector, said parallax corrector, said state-of-photographic lens sensing member and said distance indicator is collapsed on said mount, preventing attachment to a camera.

22. A nearby photography adapter according to claim 16, wherein said illumination light corrector is any one of a diffusing sheet, a density filter, and a transparent sheet having numerous dots, of which concentration is constant, arranged thereon.

23. A nearby photography adapter according to claim 16, wherein said illumination light corrector is realized with a micro-prism for deflecting illumination light at a plurality of different angles of deflection.

24. A nearby photography adapter according to claim 16, wherein said illumination light corrector includes a sheet reflector for reflecting rays irradiated to the outside of a range of nearby photography in said flashing lighting unit.

25. A nearby photography adapter according to claim 16, wherein said illumination light corrector is a combination of at least two different kinds of members or at least two members of the same kind, and each member is a diffusing sheet, a deflecting microprism, a device for controlling an amount of transmitted light, or a sheet reflector.

26. A nearby photography adapter according to claim 21, wherein: said nearby photography adapter can be attached to a camera capable of performing nearby photography at two or more camera-to-subject distances shorter than those at which normal photography is performed; and at least one of said illumination light corrector, said photographic range and camera-to-subject distance indicator, and said parallax corrector is exchangeable in order to adapt to two or more different nearby photographic states.

27. A nearby photography adapter attachable and detachable to and from a camera capable of performing nearby photography in which a camera-to-subject distance is shorter than that in normal photography, said adapter comprising:

a mount on which said camera is mounted; and a photographic state sensing member, formed on said mount, and movable between being collapsed and stowed on said mount and being raised thereon and usable, for sensing whether said camera has been set to a predetermined nearby photographic state, and for, when said camera has been set to the nearby photographic state, enabling mounting of said camera on said mount.

\* \* \* \* \*